US008260789B2

(12) United States Patent
Dumais et al.

(10) Patent No.: US 8,260,789 B2
(45) Date of Patent: Sep. 4, 2012

(54) SYSTEM AND METHOD FOR AUTHORITY VALUE OBTAINED BY DEFINING RANKING FUNCTIONS RELATED TO WEIGHT AND CONFIDENCE VALUE

(75) Inventors: Susan T. Dumais, Kirkland, WA (US); Stefan David Weitz, Seattle, WA (US); Alexander George Gounares, Kirkland, WA (US); David James Gemmell, Danville, CA (US); Paul Yiu, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 12/752,155

(22) Filed: Apr. 1, 2010

(65) Prior Publication Data
US 2011/0246484 A1  Oct. 6, 2011

(51) Int. Cl.
*G06F 17/30* (2006.01)
(52) U.S. Cl. .................. 707/748; 707/706; 707/723
(58) Field of Classification Search .......... 707/705–711, 707/722–723, 737–739, 776–777, 748; 715/200, 715/205–209, 712–713, 721, 751; 706/45–50
See application file for complete search history.

(56) References Cited

U.S. PATENT DOCUMENTS

| 6,356,899 | B1 | | 3/2002 | Chakrabarti et al. | |
|---|---|---|---|---|---|
| 6,633,868 | B1 | * | 10/2003 | Min et al. ............................. | 1/1 |
| 7,188,101 | B2 | * | 3/2007 | Smyth ................................... | 1/1 |
| 7,293,019 | B2 | * | 11/2007 | Dumais et al. ................ | 707/754 |
| 7,363,282 | B2 | * | 4/2008 | Karnawat et al. ............... | 706/45 |
| 7,398,271 | B1 | * | 7/2008 | Borkovsky et al. .................. | 1/1 |
| 7,398,461 | B1 | * | 7/2008 | Broder et al. ................. | 715/208 |
| 7,590,619 | B2 | * | 9/2009 | Hurst-Hiller et al. ................ | 1/1 |
| 7,805,432 | B2 | * | 9/2010 | Smyth et al. .................. | 707/711 |
| 7,822,762 | B2 | * | 10/2010 | Payne et al. .................. | 707/765 |
| 7,970,721 | B2 | * | 6/2011 | Leskovec et al. ............... | 706/46 |

(Continued)

FOREIGN PATENT DOCUMENTS
WO  WO 2006116194  * 11/2006

(Continued)

OTHER PUBLICATIONS

Neil Y. Yen et al. "Weighting & Ranking the E-Learning Resources",2009 Ninth IEEE International Conference on Advanced Learning Technologies, pp. 701-703.*

(Continued)

*Primary Examiner* — Srirama Channavajjala
(74) *Attorney, Agent, or Firm* — Hope Baldauff Hartman, LLC

(57) ABSTRACT

Concepts and technologies are described herein for authority ranking for real time and social search. An authority index configured to store data relating to sources is generated. Data relating to the sources, including an authority value, are generated and stored at the authority index. The authority value may be defined as a function of source, topic, and point of view ("POV"), as well as other data, if desired, and may be determined based upon one or more ranking functions. The ranking functions are determined, and data corresponding to the ranking functions is obtained. Each of the ranking functions may be weighted according to a weighting function, a confidence value or interval, one or more time functions, and/or other methods. The obtained authority value may be used for affecting ranking of search results or for other purposes.

20 Claims, 6 Drawing Sheets

U.S. PATENT DOCUMENTS

| | | | |
|---|---|---|---|
| 2003/0028520 A1* | 2/2003 | Alpha | 707/2 |
| 2006/0224580 A1* | 10/2006 | Quiroga et al. | 707/5 |
| 2006/0248076 A1* | 11/2006 | Troy et al. | 707/5 |
| 2007/0038646 A1* | 2/2007 | Thota | 707/100 |
| 2007/0088692 A1* | 4/2007 | Dean et al. | 707/5 |
| 2007/0214137 A1* | 9/2007 | Gloor | 707/6 |
| 2008/0114755 A1* | 5/2008 | Wolters et al. | 707/5 |
| 2008/0275849 A1* | 11/2008 | Basu et al. | 707/3 |
| 2008/0281915 A1* | 11/2008 | Elad et al. | 709/204 |
| 2009/0055359 A1* | 2/2009 | Gross | 707/3 |
| 2009/0106231 A1 | 4/2009 | Najork | |
| 2009/0182723 A1 | 7/2009 | Shnitko et al. | |
| 2009/0234848 A1* | 9/2009 | Leff et al. | 707/5 |
| 2009/0254544 A1* | 10/2009 | Crosby et al. | 707/5 |
| 2009/0271391 A1 | 10/2009 | Kawale et al. | |
| 2009/0319518 A1 | 12/2009 | Koudas et al. | |
| 2010/0306249 A1* | 12/2010 | Hill et al. | 707/769 |

FOREIGN PATENT DOCUMENTS

| | | | |
|---|---|---|---|
| WO | WO 2008023904 | * | 2/2008 |
| WO | WO 2009/023984 | * | 2/2009 |

OTHER PUBLICATIONS

Ding, et al., "AuthorRank: Ranking Improvement for the Web", Retrieved at <<http://www.scharffe.fr/pub/author-RankRankingImprovementForTheWeb.pdf>>, Oct. 12, 2007, pp. 7.

Kleinberg, Jon M., "Authoritative Sources in a Hyperlinked Environment", Retrieved at <<http://www.cs.cornell.edu/home/kleinber/auth.pdf>>, Proceedings of the ninth annual ACM-SIAM symposium on Discrete algorithms, Jan. 25-27, 1998, pp. 34.

Bogers, et al., "Authoritative ReRanking in Fusing Authorship Based Subcollection Search Results", Retrieved at <<http://ilk.uvt.nl/~toine/publications/bogers.2006.dir2006-paper.pdf>>, 2006, pp. 7.

Bogers, et al., "Authoritative Re-ranking of Search Results", Retrieved at <<http://ilk.uvt.nl/~toine/apropos/papers/ bogers.2006.ecir2006-poster.pdf>>, Mar. 28, 2006, pp. 4.

Harth, et al., "Using Naming Authority to Rank Data and Ontologies for Web Search", Retrieved at <<http://sw.deri.org/2007/03/tensor/iswc2009.pdf>>, Proceedings of the 8th International Semantic Web Conference, Oct. 25-29, 2009, pp. 16.

* cited by examiner

400

| SUBORDINATE RANKING FUNCTION | VALUE |
|---|---|
| 402A — FOLLOWERS/SUBSCRIBERS TO DATA FEED | 563,262 — 404A |
| 402B — NUMBER OF FORWARDED DATA FEEDS | 18,754 — 404B |
| 402C — PERCENTAGE OF DATA FEEDS FORWARDED | 0.97 — 404C |
| 402D — NUMBER OF POSITIVE/NEGATIVE RATINGS | 14,352 — 404D |
| 402E — NUMBER OF REVIEWS | 3,987 — 404E |
| 402F — NUMBER OF LINKS TO POSTINGS | 87,542 — 404F |
| 402G — EMPLOYMENT BY HIGHLY RATED INSTITUTION | 1 — 404G |
| 402H — GRADUATION FROM HIGHLY RATED INSTITUTION | 1 — 404H |
| 402I — CITATION OF SCHOLARLY WORKS | 0 — 404I |
| 402J — EMPLOYING INSTITUTION IS HIGHLY CITED | 1 — 404J |
| 402K — EMPLOYING INSTITUTION IS HIGHLY RANKED | 1 — 404K |
| 402L — EXPLICIT RATING | 95 — 404L |
| 402M — NETWORKS OF AUTHORITY COMPUTATION | N/A — 404M |
| 402N — COLLABORATIVE FILTERING COMPUTATION | 0 — 404N |
| 402O — CLAIMS OF AUTHORITY | 25 — 404O |
| 402P — AUTHORITY KNOWLEDGE BASES | 54 — 404P |
| 402Q — NUMBER OF PATENTS | 21 — 404Q |

FIG. 4

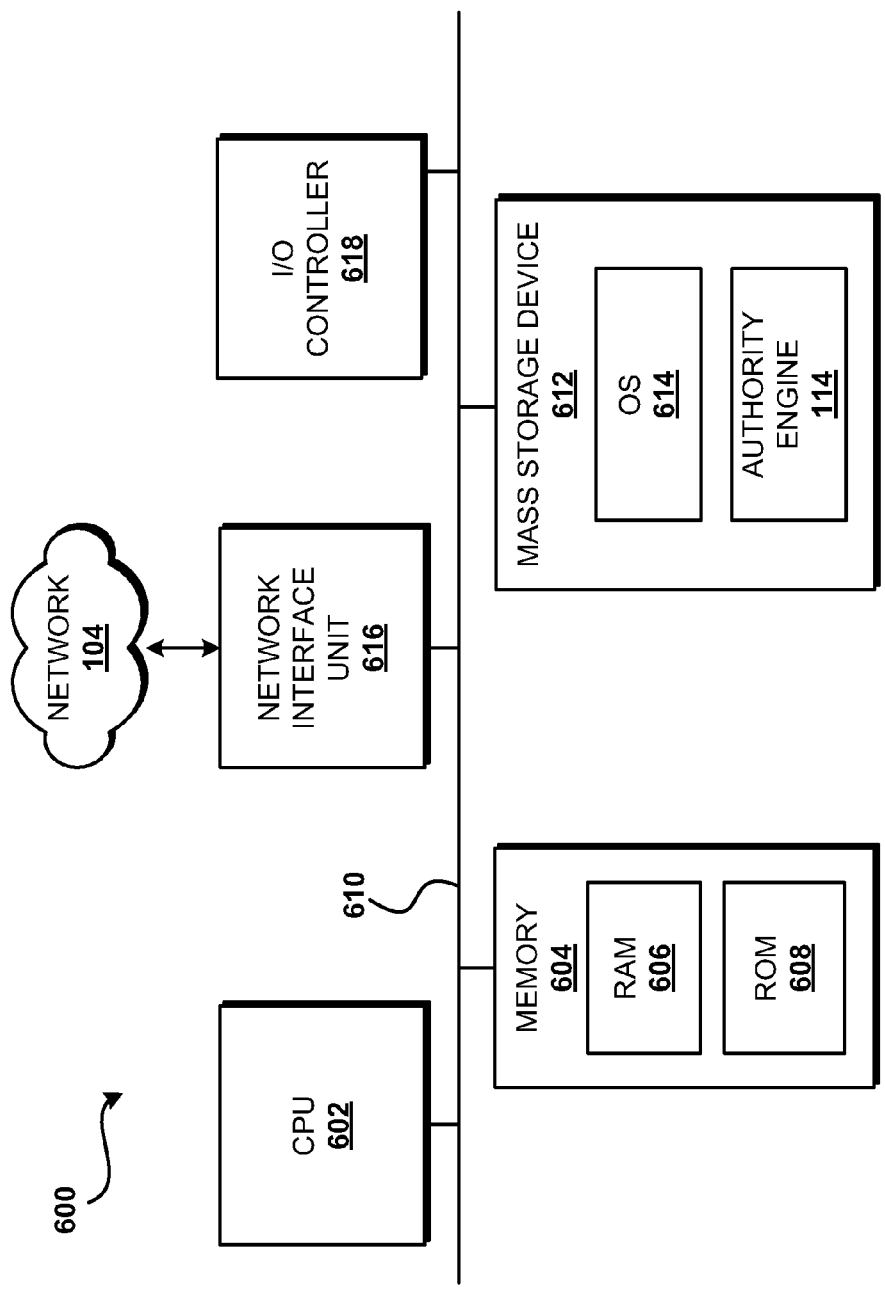

SYSTEM AND METHOD FOR AUTHORITY VALUE OBTAINED BY DEFINING RANKING FUNCTIONS RELATED TO WEIGHT AND CONFIDENCE VALUE

BACKGROUND

The amount of content accessible via the Internet has increased rapidly. Similarly, the search capabilities provided by search engines and other platforms continue to improve, as the importance of precise and accurate search capabilities has become an important aspect of Internet usage. In response to a search query, search engines identify documents that satisfy one or more keywords identified in the query. The search results presented to the searcher may be organized in order of relevance, where relevance may be defined by various algorithms and/or criteria. The searcher may interact with the search results, for example, by clicking on and following a link to the content corresponding to a search result, if desired.

Current search technologies tend to rely heavily upon a popularity measure to identify documents that are relevant to a search query. Popularity may be defined by the number of times the document has been read, the number of links that point to the document, or other measures. The popularity of a particular document, however, does not necessarily indicate that the document is relevant to the search query, or that the document is associated with sources that are considered reliable with respect to the subject matter of the document.

It is with respect to these and other considerations that the disclosure made herein is presented.

SUMMARY

Concepts and technologies are described herein for authority ranking. The concepts and technologies herein can be used to determine the authority of sources associated with content, for example, search results generated by a search engine. By considering the authority of sources associated with the search results, the most authoritative results, as opposed to the most popular results, can be provided.

According to one aspect, an authority index configured to store data is generated. The authority index includes one or more data storage devices configured to store data relating to one or more sources, for example an author, institution, web site, or other source. Data relating to the sources, including an authority value, are generated and stored at the authority index. The authority value can be defined as a function of source, topic, and/or a point of view ("POV"), as well as other data, if desired, and can indicate whether or not a source is considered trustworthy, reliable, respected, or otherwise authoritative with respect to a particular topic.

The authority value may be obtained by defining one or more ranking functions and obtaining data corresponding to the ranking functions. Each of the ranking functions may be weighted according to a weighting function, a confidence value or confidence interval, and/or one or more time functions, if desired. The weighted ranking functions may then be combined to obtain the authority value. The obtained authority value may be used for affecting ranking of search results or for other purposes.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a data structure diagram illustrating a data structure of data stored in an authority index, according to an exemplary embodiment of the present disclosure.

FIG. 6 is a computer architecture diagram illustrating an exemplary computer hardware and software architecture for a computing system capable of implementing aspects of the embodiments presented herein.

DETAILED DESCRIPTION

Figure 1:
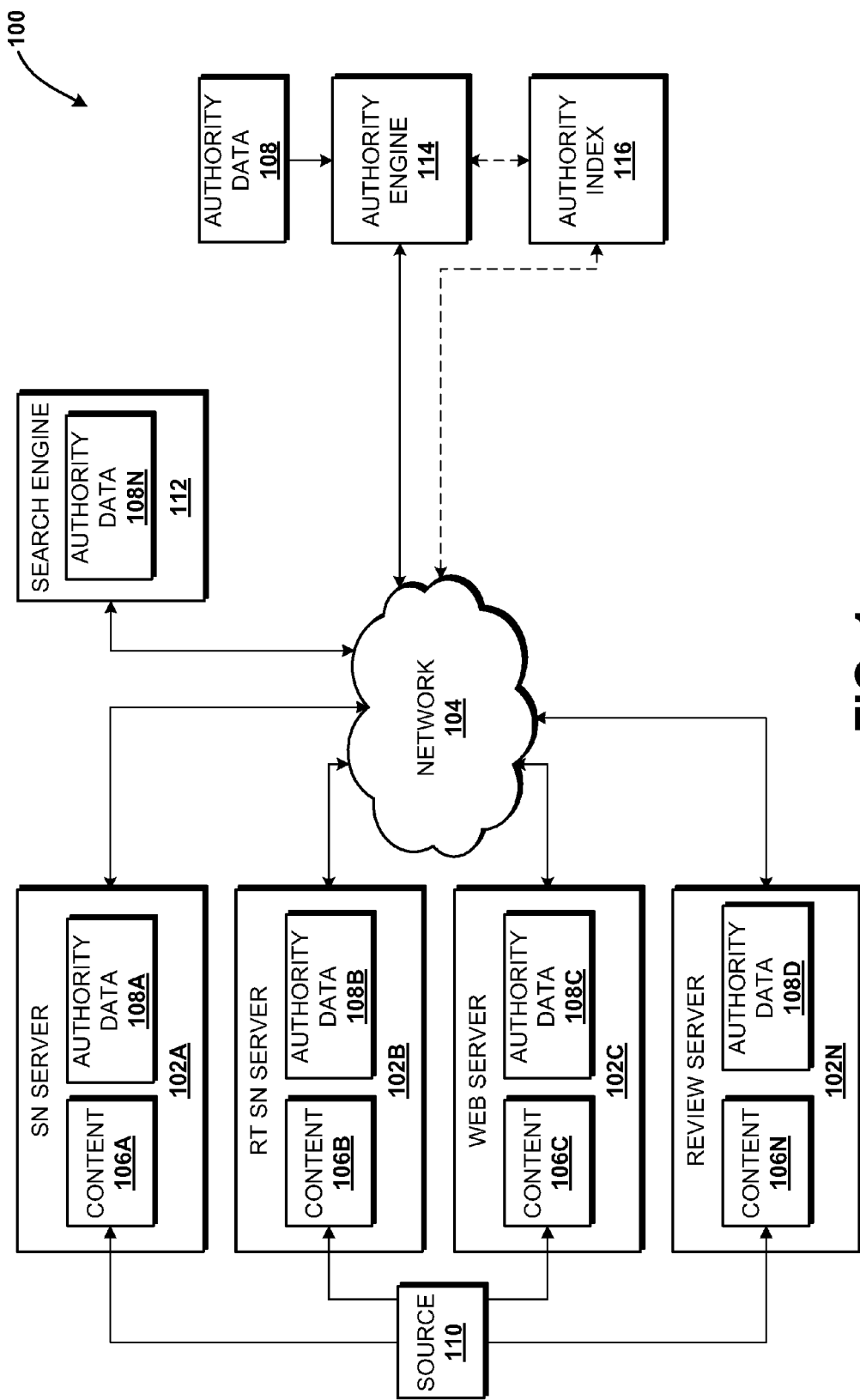
FIG. 1 is a system diagram illustrating an exemplary operating environment for the various embodiments disclosed herein.

The following detailed description is directed to technologies for providing authority ranking. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing authority ranking will be presented.

As used herein, the term "authority," and variants thereof, is used to refer to the trustworthiness, reliability, knowledgeability, and/or respect associated with a source with regard to a particular topic. A source that is an authority on a topic may be considered to be authoritative with respect to that topic. The indication that a source is deemed authoritative may be determined based upon various data relating to the source, e.g., how many educational degrees are held by the source, where the degrees were obtained, citations of the source in scholarly or technical works, and the like. Additionally, the authority of a source may be described with an authority score or authority value, and may be stored at and/or retrieved from a data storage device. While the popularity of a source may be considered in determining the authority of a source, the authority of a source may not be limited to simple popularity of the source or content associated with the source.

Referring now to FIG. 1, aspects of one operating environment 100 for the various embodiments presented herein will be described. The operating environment 100 shown in FIG. 1 includes "N" servers 102A-N hereinafter collectively referred to as "servers 102." The servers 102 operate on or in communication with a network 104. The servers 102 can be web servers that are accessible via the Internet and/or other networks, and can host data. In the illustrated embodiment, the servers 102 host respective instances of content 106A-N, hereinafter collectively referred to as content 106. The content 106 can include, but is not limited to, one or more files, folders, presentations, articles, Internet content, social networking data, videos, audio files, documents, editorials, program output, data, combinations thereof, and the like. The content 106 also can include services and data relating to services such as, but not limited to, real-time messaging services, booking engines or services, travel services, financial services, scheduling services, as well as other dynamic data and/or streaming data. Thus, the word "content," as used herein and in the claims should not be construed as being limited to static data sources.

The content 106 may be authored, generated, or otherwise provided by one or more sources 110. The sources 110 can include, but are not limited to, one or more individuals, software, organizations, institutions, groups of individuals and/or institutions, companies, businesses, universities, think-tanks, government entities, combinations thereof, and the like. Thus, the content 106 can include almost any type of data, and the content 106 can be associated with almost any type of source 110. The content 106 is illustrated as being hosted on the servers 102. It should be appreciated, however, that the content 106 might be stored at other computer systems.

The servers 102 also may store authority data 108. The authority data 108 is data that is relevant to determining the authority of a source 110 with respect to content 106. For instance, the source 110 may interact with a social networking application hosted by a social networking server 102A, such as the FACEBOOK social networking service. Statistics relating to the usage of the social networking application by the source 110 may be stored by the social networking server 102A as the authority data 108A. Exemplary data that may be stored as the authority data 108A includes, but is not limited to, the number of postings authored by and/or commented on by the source 110, the number of links provided by the source 110, the treatment, by other users, of content 106 associated with the source 110, as well as other statistics relating to usage of the social networking service by the source 108. As will be explained herein, the authority data 108A can be analyzed to determine the authority of a source 110 associated therewith.

The source 110 also may interact with a real-time social networking messaging application hosted by a real-time social networking server 102B such as the TWITTER real-time social messaging service. Data associated with the source 110 can be stored at the real-time social networking server 102B as the authority data 108B. Statistics relating to the usage of the real-time social networking application by the source 110 also can be stored by the real-time social networking server 102B as the authority data 108B. Exemplary data that may be stored as the authority data 108B includes, but is not limited to, real-time social network data, a number of messages or status messages associated with the source 110, a percentage of reposted or forwarded messages or status messages, a number of reposted messages or status messages associated with the source 110, a number of followers of the source 110, and other data and/or statistics relating to the source 110.

In some embodiments, the source 110 authors content 106C hosted by a web server 102C. Data associated with the source 110 and/or usage of the content 106C associated with the source 110 can be stored at the web server 102C as the authority data 108C. Exemplary data that may be stored as the authority data 108C includes, but is not limited to, a number of times the content 106C has been retrieved, explicit authority rankings or ratings, and/or other data and/or statistics relating to the source 110.

The source 110 also may interact with a web-based application for reviewing products, services, businesses, and the like, hosted by a review server 102N. Data corresponding to reviews by the source 110 can be stored at the review server 102N as the content 106N. Ratings of the stored reviews, i.e., the content 106N, can be stored at the review server 102N as the authority data 108D. For example, if the source 110 created a review that other users rated poorly, an indication to that effect may be stored as the authority data 108D. Statistics relating to the usage of the review application by the source 110 also can be stored by the review server 102N as the authority data 108D. Exemplary data that may be stored as the authority data 108D includes, but is not limited to, a number of reviews, a number of ratings, a number of positive ratings, a number of negative ratings, and other data and/or statistics relating to the source 110.

The operating environment 100 also includes a search engine 112 operating on or in communication with the network 104. The search engine 112 is configured to search one or more networks 104 for authority data 108N associated with the source 110, and can store the authority data 108N at a data storage location, or return the data to a requesting entity, if desired. The search engine 112 may search any number of servers, computers, and the like, to obtain the authority data 108N associated with the source 110. Exemplary data that may be stored as the authority data 108N includes, but is not limited to, indications as to whether the source is employed by or graduated from a highly rated institution, whether scholarly works authored by the source 110 are cited in other scholarly or technical works, whether the institution that employs the source 110 is highly cited, explicit ratings information, a number of patents held by the source 110, and other data and/or statistics relating to the source 110.

It should be understood that the content 106 and the authority data 108 can be associated with a source 110 based upon a variety of relationships between the content 106 and the source 110. For example, the content 106 may be created by a source 110, consumed by the source 110, and/or posted or otherwise shared by the source 110 with a website or social network. Similarly, the source 110 may provide a link to the content 106 or author commentary concerning the content 106. Various aspects of the content 106 and/or the authority data 108 may be determined and associated with the source 110. It also should be understood that the servers 102 are merely illustrative, and that the illustrated and described content 106 and authority data 108 may be obtained from other types of servers and/or data storage devices.

The operating environment 100 further includes an authority engine 114 operating on or in communication with the network 104. The authority engine 114 includes one or more software modules for obtaining the authority data 108 for the sources 110, and determining an authority value for the sources 110, as described herein. The software modules can include, but are not limited to, search engine applications, authority applications, ranking applications, data analysis applications, and the like. It should be understood that the functionality of the authority engine 114 may be provided by one or more program modules.

The authority engine 114 includes or is in communication with a data storage device configured to store authority values that indicate the authority of the sources 110. In the illustrated implementation, the authority engine 114 is in communication with an authority index 116. The authority index 116 stores authority values corresponding to one or more of sources 110. The authority engine 114 can communicate with the authority index 116 directly and/or via the network 104.

The authority engine 114 is configured to access the data stored at the authority index 116, as well as the authority data 108 received from the various elements of the network 104, to determine the authority value associated with a source 110 on a given topic from a given point of view ("POV"). In some embodiments, the authority engine 114 also bases the authority value upon location, time, and/or other information associated with the source 110 and/or the content 106.

In operation, the authority engine 114 is configured to search the network 104, as well as devices operating thereon and/or in communication therewith, to identify sources 110, and to determine the authority of the sources 110, as will be explained herein. The determined authority of the sources 110 may be used by search engines to supplement searching operations and/or to weight search results based upon the authority of the sources 110 of content 106 identified during the search. The determined authority also may be used to obtain reviews and/or ratings from sources 110 determined to be more authoritative, for determining qualifications of a source 110, e.g., prior to a job interview, to search for authoritative sources 110 on a particular topic, to increase or decrease an amount paid for a paid review from a source 110 based upon authority of the source 110, to provide a source search feature wherein a party can search for an authoritative source 110 on a particular topic, for recommending connections in social networking applications based upon the authority of a source 110 on a topic in which a party has an interest, and the like. In some embodiments, the authority engine 114 determines the authority of the sources 110 and stores data indicating the authority of the sources 110 at the authority index 116.

It should be appreciated that the operating environment 100 illustrated in FIG. 1 is one embodiment of a suitable operating environment. Other operating environments for providing the functionality disclosed herein may be utilized.

Figure 2:
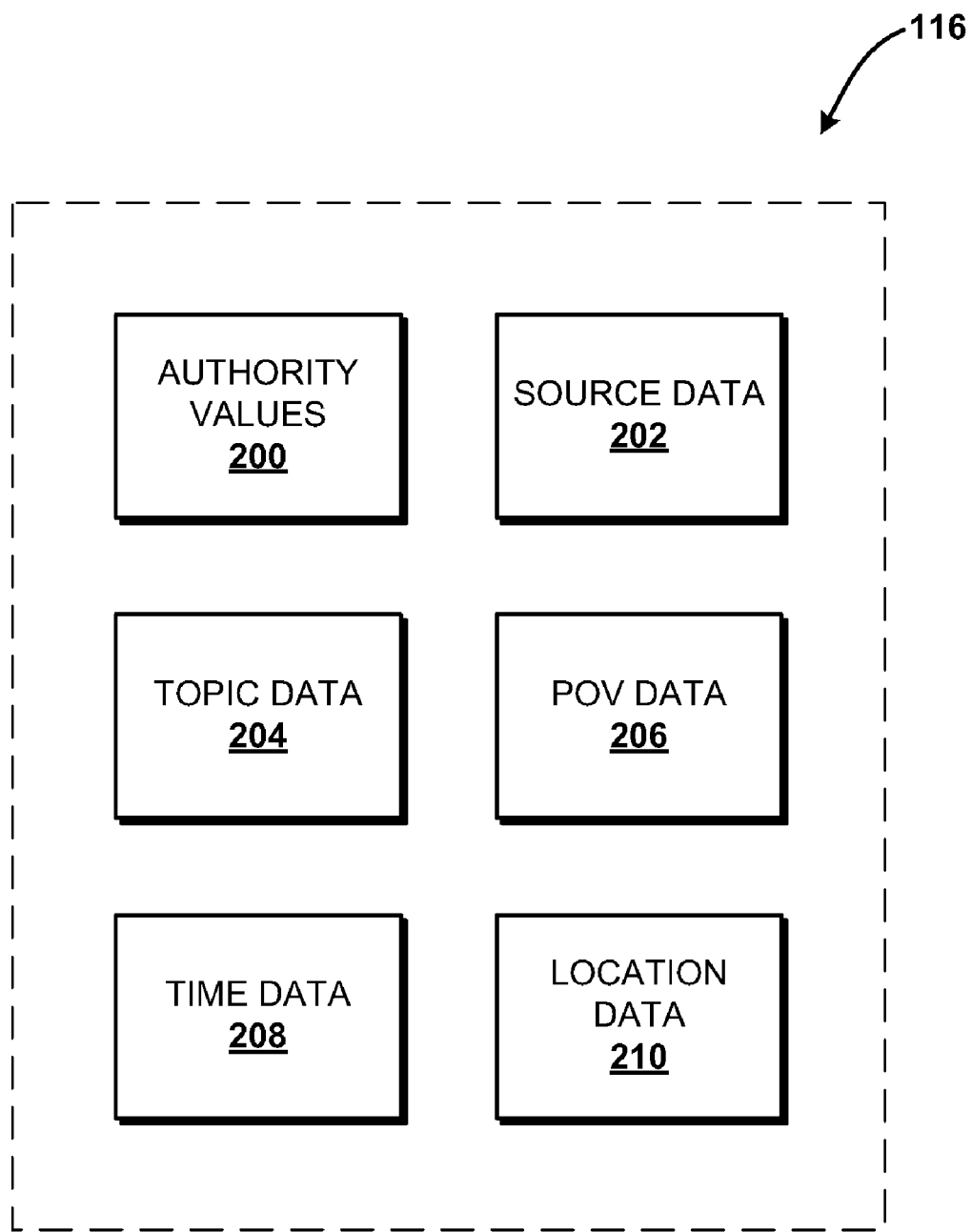
FIG. 2 is a block diagram illustrating additional aspects of an authority index, according to an exemplary embodiment of the present disclosure.

Turning now to FIG. 2, additional aspects of the authority index 116 are described. In particular, FIG. 2 is block diagram illustrating the authority index 116, according to an exemplary embodiment of the present disclosure. It should be understood that the illustrated authority index 116 is exemplary, and should not be construed as being limiting in any way.

As mentioned above, the authority index 116 stores data associated with one or more sources 110. The data stored in authority index 116 can be generated at any time, and can relate to any number of the sources 110. In some embodiments, the data stored at the authority index 116 is generated by entities and/or software by searching networks such as the Internet for sources 110 and analyzing social networks and content 106 associated with the sources 110.

Social networks associated with the sources 110 are analyzed to determine various aspects of the social networks, e.g., the number of members in the social network of a source 110, how content 106 associated with the source 110 is treated by members of the social network of the source 110, and the like. Additionally, or alternatively, content 106 and or social networks associated with the sources 110 may be analyzed to determine time and/or location information associated with the sources 110, and to obtain other data associated with the content 106. The obtained data can be stored in the authority index 116.

The data stored at the authority index 116 can include, but is not limited to, authority values 200, source data 202, topic data 204, point of view ("POV") data 208, time data 208, location data 210, other data (not illustrated), combinations thereof, and the like. The functionality of the authority index 116 can be provided by one or more data storage devices associated with the authority engine 114. In some embodiments, the functionality of the authority index 116 is provided by one or more memory devices and/or databases associated with the authority engine 114. The illustrated embodiment is exemplary, and should not be construed as being limiting in any way.

The authority values 200 are scores defining the authority of a source 110 with respect to a topic, POV, time, and location defined in a respective record. The authority values 200 can be indicated using any desired units. In the illustrated embodiment, the authority values 200 are defined as a numeric score between 0.00 and 1.00, wherein 0.00 indicates no authority and 1.00 indicates the most authority. The authority values 200 may be determined according to various methodologies. One exemplary embodiment of determining the authority values 200 is illustrated and described with respect to FIGS. 4-5.

In one embodiment, an authority determination formula is used to calculate the authority values 200, and includes, but is not limited to, various combinations of weighted and unweighted parameters relating to a source 110. Exemplary parameters include a number of publications associated with a source 110, a number of social network connections and/or followers, whether or not the source 110 is employed by and/or graduated from a well respected and/or highly cited institution, social networking information such as a number of posts relating to the source 110 and/or a particular topic addressed by the source 110, a number of patents held by the source 110, a number of links to content 106 associated with the source 110, a number of articles citing work associated with the source 110, one or more ratings associated with the source 110, and the like. These and other parameters may be used to generate an the authority value 200 for the source 110 in general, and/or with respect to a particular topic, time, location, content 106, POV, and the like.

The source data 202 identifies one or more sources 110 with whom the authority values 200 are associated. The source data 202 can include a name of the source 110, one or more Internet protocol ("IP") addresses associated with the source 110, one or more domain names or uniform resource locators ("URL's") associated with the source 110, as well as names of organizations, companies, institutions, groups, and/or individuals associated with the source 110, other entities associated with the source 110, combinations thereof, and the like. The source data 202 also can indicate relationships between one or more sources 110. For example, some sources 110 of content 106 have two or more personas, e.g., domain names, blog sites, social networks, pseudonyms, and the like. The source data 202, therefore, can include data relating two or more sources 110 to each other based upon identified relationships, e.g., by identifying a first source 110 as a pseudonym, a research assistant, a child, a parent, a lab partner, a business partner, or the like, of a second source 110.

The source data 202 may be explicitly set forth in content 106, for example, in a file header or other data structure in the content 106. Additionally, or alternatively, content 106 can include an explicit author or source identification, for example, a byline of an article that identifies an author, an institution, a publication, a domain name, or another source 110 as defined herein. In some embodiments, the source data 202 is not explicitly set forth in the content 106.

If the source data 202 is not explicitly set forth in the content 106, the source data 202 may be determined based upon other information identified in the content 106 and/or from contextual information relating to the content 106. For example, the source data 202 can be determined based upon a domain name from which the content 106 is retrieved, an institution associated with the content 106, a geographic location associated with the content 106, and the like.

In some embodiments, the source data 202 refers to a source 110 that has consumed the content 106. Consumption of content 106 by a source 110 deemed to be authoritative can be understood by the authority server 116, or any other entity generating the authority index 116, as indicating that the content 106 is authoritative, and/or is more or less authoritative on the basis of the association with the source 110. It should be understood that the authority of a source 110 and/or the lack thereof, may be reflected as a range of authority scores or values that range from not authoritative to authoritative, and various degrees of authority therebetween. Thus, authority of a source 110 as disclosed herein should not be construed as being limited to a true or false indication, though such embodiments are contemplated. In some embodiments, the source 110 that consumed the content 106 is associated with the content 106 in the authority index 116 merely by virtue of the consumption of the content 106 by the source 110. Regardless of how the source data 202 is obtained, the source data 202 may be stored at the authority index 116.

The topic data 204 identifies one or more topics associated with a source 110 and/or the authority value 200 associated with a source 110. For example, the topic data 204 can identify one or more topics addressed in content 106, associated with the source 110, one or more topics with which the source 110 is associated, and the like. As mentioned above, a source 110 may be associated with more than one topic, and may be viewed as being authoritative on none, some, or all of the topics. As mentioned above, a source 110 may be viewed as being authoritative on a topic based, at least partially, upon a high authority score or value with respect to that topic. In some embodiments, the topic data 204 is explicitly presented in content 106 associated with the source 110, or is determined based upon the context of the content 106. Content 106 associated with the source 110 may be analyzed to determine topics addressed by the source 110, and the topics can be stored as topic data 204.

The point of view ("POV") data 206 defines a perspective from which a source 110 is considered authoritative. The POV data 206 may be defined in any desired terms. In some embodiments, the POV data 206 includes a global POV, i.e., whether the source 110 is globally accepted as authoritative with respect to a particular topic, a local POV, i.e., whether a particular individual considers the source 110 authoritative with respect to a particular topic, a group POV, i.e., whether a group considers the source 110 authoritative with respect to a particular topic, and the like. Additional and/or alternative POV's are contemplated. In some embodiments, the authority index 116 defines authority from a global perspective, i.e., from a global POV. In such embodiments, the POV data 206 may be irrelevant to determining authority of a source 110, and therefore may be omitted.

The time data 208 identifies a time at which the authority value 200 of the source 110 is calculated. The authority of a source 110, both in general and with respect to a particular topic, may change over time. For example, a source 110 may be considered the foremost expert on a particular topic at a first time, but his or her expertise may be surpassed by another source 110 at a second time. Therefore, the time data 208 can be used to further define authority by adding an optional time component. The time data 208 may be defined in any desired units including, but not limited to, a time of day, a time after or before a particular event, a date, a month, a year, or other desired time increments.

The location data 210 identifies a location associated with the source 110 and/or the authority value 200 associated with the source 110. For example, if a source 110 is associated with a particular university, the geographic location of the university may be indicated by the location data 210 and thereby associated with the authority value 200. With respect to social networking services, a source 110 may indicate his or her location during creation of an account, but otherwise may make no reference to his or her geographic location. While the source 110 does not explicitly reference his or her location in every social networking activity, the location of the source 110 may be important in gauging the authority of the source 110 with respect to a particular topic and/or clarifying the authority with respect to a topic. For example, if a source 110 is considered authoritative on the mayor of his or her town, it would be beneficial to identify the town in which the source 110 is located so the mayor of the town may be identified by name or city. When an entity conducts a search for the mayor by name, the source 110 may be identified as an authoritative source 110 of information regarding the mayor, though content 106 associated with the source 110 may never mention the mayor by name.

Similarly, if content 106 associated with the source 110 describes a particular location, the location data 210 can include an indication of the location addressed by the content 106. If content 106 associated with the source 110 is generated at a particular location, the location data 210 can include an indication of that location. Regardless of how the location data 210 is determined, the location data 210 can be associated with the authority value 200, and may be used by the authority server 116 to determine the authority of a source 110 with respect to a location. Additionally, the location data 210 can be used to generate maps of authority, i.e., to place authoritative sources 110 on a map viewable by a user to locate authoritative sources that are local to the user.

The location data 210 also may be used in conjunction with other types of data stored at the authority index 116 to identify authoritative sources 110 and/or content 106. To illustrate the use of the various data stored in the authority index 116, consider an example in which a searching entity wishes to identify a practicing attorney in New York City, N.Y. who is considered by other attorneys to be an expert on patent law. To identify such a source 110, the authority value 200, the source data 202, the topic data 204, the POV data 206, the time data 208, and the location data 210 may be used.

The topic data 204 may be used to identify sources 110 who are considered authoritative on patent law. The POV data 206 may be used to narrow the identified sources 110 based upon sources 110 considered to be authoritative by other attorneys, i.e., a specific group, assuming such a POV is recognized and that data for that group exists in the authority index 116. The time data 208 may be used to identify sources 110 who are licensed to practice patent law, i.e., the particular time is defined as current by limiting the search to attorneys who are currently licensed and therefore, presumably, practicing patent law. The location data 210 may be used to identify sources 110 who are associated with New York City, N.Y., i.e., a particular location.

A source 110 that satisfies the topic, POV, time, and location criteria can be considered an authoritative source 110 for the criteria. If more than one source 110 satisfies the topic, POV, time, and location criteria is identified, the authority values 200 may be used to identify the most authoritative source 110 satisfying the search criteria. The source data 202 corresponding to the identified source 110 may be returned to the searching entity. This example is merely illustrative of how authority values 200, source data 202, topic data 204, POV data 206, time data 208, and location data 210 may be used to identify an authoritative source 110 for a particular topic, POV, time, and location, and should not be construed as being limiting in any way. It should be understood that the various data described herein may be used to evaluate sources 110 associated with search results generated by a search engine to determine if the search results are associated with authoritative sources 110.

The authority index 116 also can store other data (not illustrated) for use in evaluating the authority of sources 110. The other data can include, but is not limited to, a gender of a source 110, a country of origin associated with the source 110, a language associated with the source 110, entities and/or other sources 110 related to the source 110, an indication of a type of content 106 associated with the source 110, ranking or rating data, pseudoURL's, descriptions of content 106 associated with the source 110, and the like.

Ranking and ratings can include ratings or rankings of the source 110, e.g., poll results from a poll of others in the field, rankings of top experts, and the like. PseudoURL's can describe or provide links to content 106 associated with the source 110. Descriptions of content 106 can include statistics associated with the content 106, e.g., a number of words in the content 106, a version number associated with the content 106, a copyright date of the content 106, and/or other information. The other data can be used to associate content 106 with a source 110, a topic, a POV, an authority, a time, a location, and/or other information.

It should be understood that a particular source 110 can be considered authoritative with respect to one or more topics, but may not be considered authoritative with respect to other topics. For example, the source 110 may have a high authority score or value with respect to one or more topics, but may have a low authority score or value with respect to other topics. The determination as to what defines a high or low authority value may be set by preferences or by user input. Similarly, the source 110 can be considered authoritative with respect to one or more times, POV's, and/or locations, but may not be considered authoritative with respect to other times, POV's, and/or locations. For example, the source 110 may have a high authority score or value with respect to one or more times, POV's, and/or locations, but may have a low authority score or value with respect to other times, POV's, and/or locations. Thus, a particular source 110 can be represented one or more times in the authority index 116. The source 110 may be associated with more than one authority value 200, source data 202, topic data 204, POV data 206, time data 208, location data 210, and/or other data. It should therefore be understood that the source 110 may be associated with more than one authority value 200.

Figure 3:
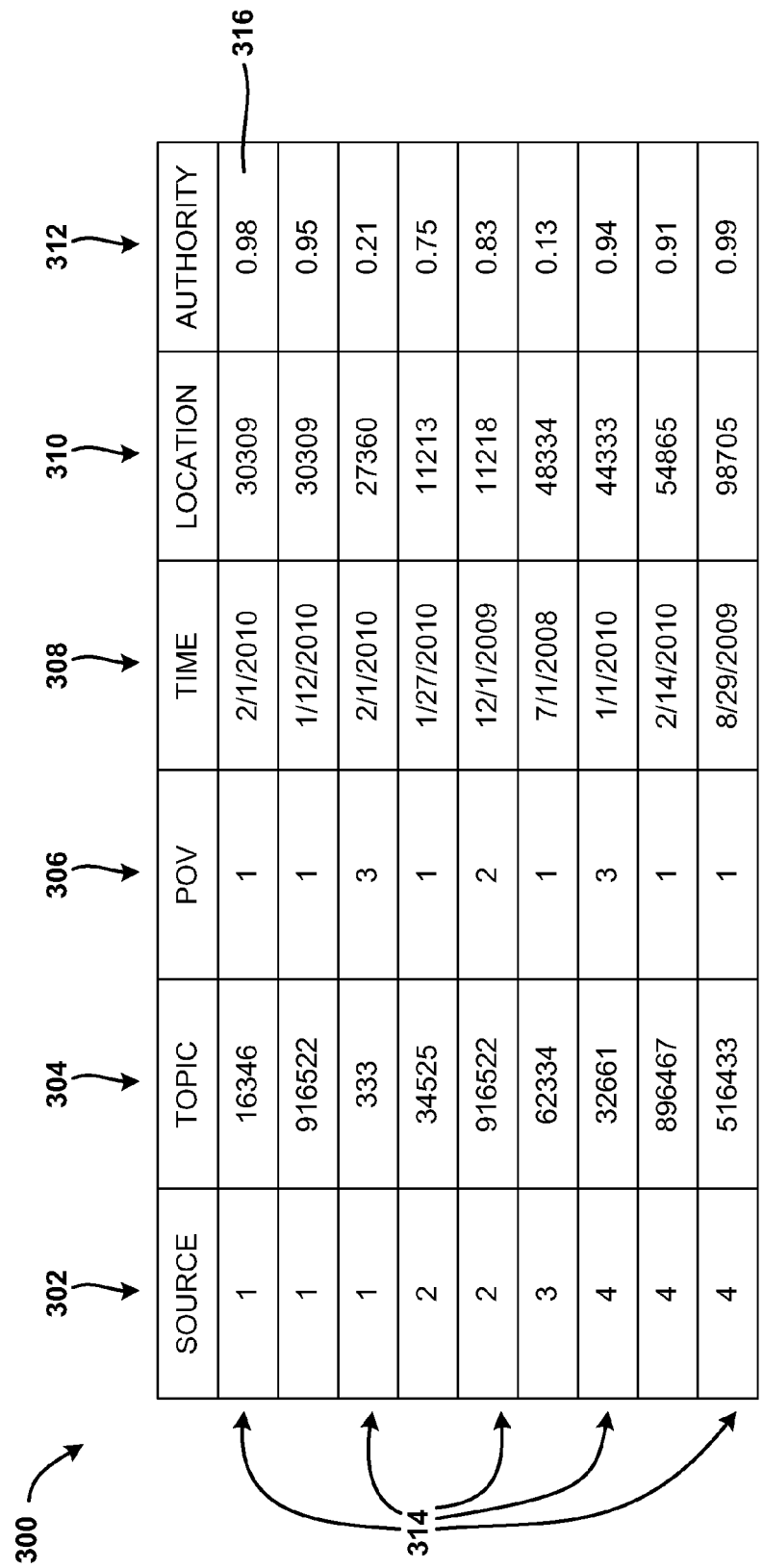
FIG. 3 is a data structure diagram illustrating a data structure of data stored in an authority index, according to an exemplary embodiment of the present disclosure.

FIG. 3 schematically illustrates an authority table 300, according to an exemplary embodiment of the present disclosure. It should be understood that the authority table 300 may include millions of data entries. The illustrated authority table 300 may therefore represent a truncated representation of an exemplary authority table 300, and is provided for purposes of clarifying the concepts disclosed herein.

The authority table 300 includes data describing sources 110, for example, data included in the authority index 116 described and illustrated above with reference to FIGS. 1 and 2. The authority table 300 can be generated at any time, and can be stored at a data storage device. In some embodiments, the authority table 300 includes the data stored in the authority index 116, and is periodically updated. In other embodiments, the authority table 300 is built by the authority engine 114 in response to a search performed by a search engine. In some embodiments, as mentioned above, the authority table 300 is built and/or maintained offline, routinely, and/or according to schedules and/or time tables. In the illustrated embodiment, the date of the authority index 116 is stored in a database or table, a portion of which is illustrated in the authority table 300.

The authority table 300 is illustrated as storing data organized into a source column 302, which contains the source data 202 described above. The authority table 300 also includes a topic column 304, which contains the topic data 204 described above, a POV column 306, which contains the POV data 206 described above, a time column 308, which contains the time data 208 described above, a location column 310, which contains the location data described above, and an authority column 312, which contains the authority values 200 described above. The authority table 300 can include additional columns (not illustrated).

The authority table 300 stores a number of records 314, wherein each record 314, i.e., each row, corresponds to a source 110 for which authority values 200 exist. As illustrated, the authority table 300 can include multiple records 312 corresponding to the same source and/or topic. For example, the authority table 300 include three records 312 identifying "1" as the source 110, and two records 312 identifying "916522" as the topic. It should be understood that for a particular topic, there may be only one record 314 in the authority index 116, or there may be more than one record 314 in the authority index 116. Therefore, it should be understood that for a particular topic, one or more authoritative sources 110 may be represented in the authority index 116. Each of the records 314 includes data 316 representing the authority value 200.

The authority engine 114, or a search engine in communication therewith, identifies one or more topics in a search query. The authority engine 114, searches the authority index 116 to identify one or more authoritative sources 110 associated with the topics. The authority engine 114 can search the authority table 300 for the topics, and obtain records 314 associated with the topics. The records 314 can be ranked and/or narrowed based upon additional criteria, e.g., POV, time, location, source, authority, and the like. In some embodiments, search results are analyzed to determine if one or more sources 110 associated with the search results are considered authoritative. Search results associated with authoritative sources can be ranked higher than other search results, or may be used to weight the search results based upon authority. The determination as to whether sources 110 are considered authoritative may be accomplished by reviewing and/or comparing authority values 200 associated with the sources 110. In some embodiments, the authority values 200 are determined and/or updated in real time.

FIG. 4 illustrates a subordinate ranking function table 400, according to an exemplary embodiment of the present disclosure. The subordinate ranking function table 400 illustrates a number of subordinate ranking functions 402A-Q ("SRF"), as well as values 404A-Q associated with respective SRF's 402. The SRF's 402 are used to determine the authority value 200 discussed above, which may be used not only to rank sources 110, but also for filtering, weighting, or otherwise analyzing the sources 110. Additional SRF's 402 are contemplated, but are not illustrated in FIG. 4 or described in detail herein for the sake of brevity. The SRF's 402 are designed to leverage the authority data 108 collected from the servers 102 and the search engine 112 to obtain objective data indicating the authority of a source 110. Thus, the data illustrated as the inputs 404, can be obtained by obtaining the authority data 108. Data corresponding to the SRF's 402, i.e., the inputs 404, may be obtained in real time, or may be obtained and utilized to generate authority values 200 stored in the authority index 116.

The SRF 402A is directed to a number of followers or subscribers to a data feed associated with a source 110. The number of followers or subscribers to content associated with the source 110 may be understood as increasing the perceived authority of the source 110, though this is not necessarily the case. The input 404A corresponds to a number of individuals who have joined a social network associated with the source 110, to a number of followers of the source 110, and/or a number of subscribers to a data feed, e.g., an RSS feed, associated with the source 110. In the illustrated embodiment, the input 404A is "563,326," indicating that 563,362 entities follow or subscribe to content associated with the source 110. This indication is exemplary.

The SRF 402B is directed to a number of forwarded or reposted data feeds associated with the source 110. In the context of social networking services, the input 404B identifies a number of data feeds associated with the source 110 that have been forwarded to other users or reposted by other users. The number of forwarded or reposted data feeds associated with the source 110 may be understood as increasing the perceived authority of the source 110, though this is not necessarily the case. In some embodiments, the authority engine 114 is configured to recognize that the reposting and/ or forwarding of a data feed associated with a source 110 indicates that the source 110 is viewed as authoritative with respect to the subject matter of the data feed that has been reposted and/or forwarded. The input 404B corresponds to the number of forwarded or reposted data feeds associated with the source 110. In the illustrated embodiment, the input 404B is "18,754," indicating that 18,754 data feeds associated with the source 110 have been forwarded or reposted. This indication is exemplary.

The SRF 402C is directed to a percentage of data feeds associated with a source 110 that are forwarded or reposted. A raw number of forwarded data feeds, as indicated in the input 404B, is useful by itself, but may be more useful in light of a total number of data feeds associated with the source 110. The percentage of data feeds associated with the source 110 that are forwarded or reposted may be understood as correlating to the perceived authority of the source 110. For example, a higher percentage of reposted or forwarded data feeds may be understood as indicating higher authority, while a lower percentage may be understood as indicating less authority, though this is not necessarily the case. The input 404C corresponds to a percentage of data feeds associated with the source 110 that are forwarded or reposted. In the illustrated embodiment, the input 404C is "0.97," indicating that 97% of data feeds associated with the source 110 are forwarded or reposted. This indication is exemplary.

The SRF 402D is directed to a number of positive or negative ratings associated with a source 110. In some embodiments, each negative rating is counted as a negative one, and each positive rating is counted as a positive one. Thus, the total number indicated in the input 404D may indicate not only a number of ratings, but an indication of how positive and/or how negative those ratings are. In some embodiments, the SRF 402D is divided into positive and negative ratings, and the total number of ratings, both positive and negative, indicates an authority of the source 110. In still other embodiments, an average rating is used instead of, or in addition to, cumulative totals and/or net totals. In the illustrated embodiment, the input 404D is "14,352," indicating that the source 110 has a net positive 14,352 rating. This indication is exemplary.

The SRF 402E is directed to a total number of reviews associated with a source 110. The indication of how many times a source 110 has been reviewed may be understood as increasing the perceived authority, in the case of many reviews, or decreasing authority, in the case of few reviews, though this is not necessarily the case. In some embodiments, the SRF 402E may be weighted based upon the number of reviews associated with the source 110. For example, if the source 110 has been reviewed a large number of times, the SRF 402E may be given more weight than would be the case if the source 110 had been reviewed a comparatively small number of times. The determination as to what defines a large number of reviews and what defines a small number of reviews may be set by user preferences, user input, or other factors. In one embodiment, if a source 110 has been reviewed less than one hundred times, a weight associated with the SRF 402E is reduced or set to zero. Other weighting schemes are possible but will not be defined herein for the sake of brevity. The input 404E corresponds to the number of reviews, and may include an integer. In the illustrated embodiment, the input 404E is "3,987," indicating that the source 110 has been reviewed 3,897 times. This indication is exemplary.

The SRF 402F is directed to a total number of links to postings associated with the source 110. The number of links to postings associated with the source 110 may be understood as increasing the perceived authority of the source 110, though this is not necessarily the case. The input 404F corresponds to a whole integer corresponding to the total number of links to content 106 associated with the source 110. The input 404F may be useful in determining how many other sites and/or sources 110 link to content 106 associated with the source 110. In the illustrated embodiment, the input 404F is "87,542," indicating that 87,542 links associated with the source 110 have been identified. This indication is exemplary.

The SRF 402G is directed to an indication as to whether the source 110 is employed by a highly rated institution, e.g., a highly rated university, research group, company, or other entity. The indication that a source 110 is employed by a highly rated institution may be understood as increasing the perceived authority of the source 110, though this is not necessarily the case. The input 404G can be an alphanumeric score or value indicating how highly rated the institution is, and/or can be a TRUE/FALSE indication, either or both of which may be indicated by a number, text, or other input. In the illustrated embodiment, the input 404G is "1," which corresponds to "TRUE." This indication is exemplary.

The SRF 402H is directed to an indication as to whether the source 110 holds one or more degrees from a highly rated institution, e.g., a highly rated university, graduate school, degree program, or the like. The indication that a source 110 holds one or more degrees from a highly rated institution may be understood as increasing the perceived authority of the source 110, though this is not necessarily the case. The input 404H can be an alphanumeric score or value indicating how many degrees and/or how highly rated the institution is, and/or can be a TRUE/FALSE indication, either or both of which may be indicated by a number, text, or other input. In the illustrated embodiment, the input 404H is "1," which corresponds to "TRUE." This indication is exemplary.

The SRF 402I is directed to an indication as to whether content 106 associated with the source 110 is cited in scholarly works such as white papers, presentations, and the like. The determination as to what defines a "scholarly work" and a citation thereof for purposes of the SRF 402I can be set by preferences or input, if desired. Indication that a source 110 is cited in scholarly works may be understood as increasing the perceived authority of the source 110, though this is not necessarily the case. The input 404I can be a TRUE/FALSE indication, or an integer indicating the total number of citations in scholarly works. Thus, the input 404I may be indicated by a number, text, or other input. In the illustrated embodiment, the input 404I is "0," which indicates that there have been no citations in scholarly works of any content 106 associated with the source 110. This indication is exemplary.

The SRF 402J is directed to an indication as to whether the source 110 is employed by an institution that is cited in scholarly works such as white papers, presentations, and the like. As mentioned above, the definition of a "scholarly work" and a "citation" for purposes of the SRF 402J may be determined by preferences, user input, and the like. The indication that a source 110 is employed by an institution that is cited in scholarly works may be understood as increasing the perceived authority of the source 110, though this is not necessarily the case. The input 404J can be a TRUE/FALSE indication, or an integer indicating the total number of citations in scholarly works. Thus, the input 404J may be indicated by a number, text, or other input. In the illustrated embodiment, the input 404I is "1," corresponding to "TRUE," which indicates that there have been citations of the institution in scholarly works, though the number of citations is not indicated in the illustrated embodiment. This indication is exemplary.

The SRF 402K is directed to an indication as to whether the source 110 works for an institution that is highly ranked by peers, a reviewing body, or the like. The indication that a source 110 works for an institution that is ranked highly by peers, a reviewing body, or the like, may be understood as increasing the perceived authority of the source 110, though this is not necessarily the case. The input 404K can be a TRUE/FALSE indication, and may be indicated by a number, text, or other input. In the illustrated embodiment, the input 404K is "1," which corresponds to "TRUE." This indication is exemplary.

The SRF 402L is directed to an explicit authority ranking of the source 110, which may be entered by a source 110, by peers, or by others interacting with the authority engine 114. An explicit authority ranking of the source 110 may be set or corrected by a source 110, or another entity. The explicit authority ranking may be used as the authority value 200 if other data is not available, or can be weighted and considered when generating the authority value 200 in accordance with the concepts disclosed herein. The input 404L can be a number, text, or another indication. In the illustrated embodiment, the input 404L is "95," which corresponds to an authority of 0.95 out of 1.00, i.e., extremely authoritative. This indication is exemplary. Given the self-serving nature of a self-generated authority rating, the explicit authority rating may be given little relative weight when computing the authority value 200.

The SRF 402M is directed to an indication of a networks of authority computation. The networks of authority computation may be used to compute authority of a source 110 based upon a social network associated with the source 110. The networks of authority computation may be used to determine authority when trust between two or more nodes of a social network is known or may be presumed.

In one embodiment, the networks of authority computation is a presumed non-zero value, e.g., 0.5 for all topics between two social network connections. In other words, a source 110 is presumed to give all members of his or her network an authority of 0.5 for all topics. In another embodiment, a source 110 may be presumed to have an authority for all local topics, which may be higher or lower than authority on other topics. For example, a user may be presumed to have an authority of 0.7 for any local topics, while the authority of the source 110 may be higher or lower for remote topics.

In yet another embodiment, a fixed value is assigned for each type of link in a social network. For example, a source 110 with followers, subscribers, or network connections, may be treated as authoritative, at least with respect to the followers, subscribers, or connections, and may be assigned an authority value based upon a perceived authority, e.g., an authority of 0.75. Followers, subscribers, or connections of the source 110 may be given little or no authority via the networks of authority computation because their following or subscribing to a feed associated with a source 110 may not indicate any authority. In some embodiments, followers, subscribers, or connections of the source 110 are granted an authority via the networks of authority computation.

In still another embodiment, a decay factor is applied to an assigned authority value, the decay factor being applied at each network connection. For example, a source 110 may be assigned an authority of 0.5, and each of his or her connections may have an authority of 0.25, obtained by applying a decay factor of 0.5 to the authority of the source 110 for the network connection between the source 110 and the connections. Any source 110 connected to the connections may have an authority of 0.125, obtained by again applying the decay factor of 0.5 to the authority of the source 110 for each of the two network connections. Any source 110 more than two network connections away may be assigned an authority of 0.0 with respect to the source 110, if desired, or the decay factor may be repeatedly applied as long as there are network connections. Determining how to apply a decay factor, if at all, may be a matter of design choice and/or preferences.

The input 404M can be a number, text, or another indication. In the illustrated embodiment, the input 404M is "N/A," which indicates that no networks of authority computation has been performed. In some embodiments, a zero is used instead of "N/A" to indicate that no networks of authority computation has been performed and/or that the computed authority is equal to zero. Thus, it should be understood that the illustrated indication is exemplary. Again, the input 404M corresponding to the networks of authority computation can be weighted before calculating the authority value 200.

The SRF 402N is directed to an indication of a collaborative filtering of authority computation. The collaborative filtering of authority computation may be used to compute an unknown authority of a source 110 for a time, location, source, POV, or topic based upon a known authority of the source 110. For example, the authority of a source 110 with respect to a first topic and a first POV is known, but the authority of the source 110 with respect to the first topic and a second POV is not known. The authority engine 114 may determine, based upon analyzing authority values for other sources 110 across the first and second POV's, that the first POV and the second POV are similar. Thus, the authority engine 114 may use the same authority value 200 for both the first POV and the second POV. Alternatively, the authority engine 114 may determine a factor by which the authority values 200 should differ, and calculate the authority value 200 for the second POV based upon the determined factor. It should be understood that collaborative filtering of authority computation may be determined based upon source information and topic information without knowing POV information. Similarly, it should be understood that the collaborative filtering of authority computation may use location, time, POV, topic, or other information, and that the above example is illustrative.

The input 404N can be a number, text, or another indication. In the illustrated embodiment, the input 404N is "0," which indicates no collaborative filtering computation has been performed. It should be understood that an indication such as "N/A" could be substituted for the illustrated "0." Thus, it should be understood that the illustrated indication is exemplary. The input 404N corresponding to the collaborative filtering of authority computation can be weighted before calculating the authority value 200.

The SRF 402O is directed to an indication as to whether the source 110 has made any claims of authority in any content 106 associated with the source 110, e.g., tags of subjects addressed by the source 110, titles and descriptions claiming authority on web pages, or claims to authority made by others regarding the source 110. The indication that a source 110 has made claims of authority may be understood as increasing the perceived authority of the source 110, though this is not necessarily the case. The input 404O can be a TRUE/FALSE indication, or an integer indicating the total number of authority claims associated with the source 110. The input 404O may be indicated by a number, text, or other input. In the illustrated embodiment, the input 404O is "25," which indicates that there have been twenty-five claims of authority associated with the source 110. This indication is exemplary.

The SRF 402P is directed to an indication as to whether the source 110 is included in a human authored knowledge base, and if so, how the human authored knowledge base rates the authority of the source 110. The indication that a source 110 is included in a human-authored knowledge base, and if so, what his authority is, may be understood as affecting the perceived authority of the source 110, though this is not necessarily the case. The input 404P can be a TRUE/FALSE indication, which may be set to "NULL," "FALSE," or "0" if the source is not mentioned in a human-authored knowledge base, or an integer indicating the authority or average authority associated with the source 110 in the human authored knowledge base(s). In the illustrated embodiment, the input 404P is "54," which indicates that the source 110 is included in at least one human authored knowledge base, and that the source 110 is assigned an average authority of 0.54 on a scale from 0.00 to 1.00. This indication is exemplary.

The SRF 402Q is directed to an indication as to a number of patents held by the source 110, or an institution or company associated with the source 110. The indication that a source 110 has been named on an issued patent may be understood as increasing the perceived authority of the source 110, though this is not necessarily the case. The input 404Q can be a TRUE/FALSE indication, or an integer indicating the total number of patents held by the source 110. The input 404Q may be indicated by a number, text, or other input. In the illustrated embodiment, the input 404Q is "21," which indicates that the source 110 has been named as inventor on twenty-one patents. This indication is exemplary.

It should be understood that SRF's 402 described herein are exemplary of SRF's 402 that may be used to calculate the authority value 200. Additional SRF's 402 are contemplated, but are not illustrated or described herein for the sake of brevity. Additional SRF's 402 include, but are not limited to, an amount of time since a first publication associated with the source 110, an amount of time for which the source 110 has been using a social networking service, a number of works authored by the source 110, a number of degrees the source 110 holds, and the like. Some contemplated SRF's 402 include lists or categories, or references to lists or categories that may be used for determining authority of sources 110, associating authority of one source 110 with another source 110, increasing a confidence level associated with an authority determination, and/or for other purposes. The lists, categories, subsets, subcategories, and the like, may be generated by the authority engine 114, editorially created, and/or generated or created by other hardware or software.

The lists or categories can illustrate an association between one or more sources 110 and that association can be used as an indication of authority. For example, a list can be generated of all NFL players over some time period, for example, fifty years. The list can be used to find authoritative sources 110 by associating an authoritative source 110 with other sources 110 who share certain characteristics, and therefore are included in a list or category with the authoritative source 110. In the above example of a list of NFL players, a search query including the string "superbowl" may be understood by the authority engine 114 as relating to football, and the authority engine 114 can determine that NFL players may be authoritative on the subject. In other embodiments, an authoritative source 110 may be determined, and the authority engine 114 may search for other sources 110 by accessing the list. In still other embodiments, the presence of a source 110 on a list can be understood as increasing authority on a topic and/or a confidence level associated therewith. For example, a first source 110 on the list may "inherit" an authority of another source 110 on the list by virtue of their respective presences on the list. In some embodiments, the presence on a list may be indicated in an SRF 402 in a manner similar to that described above with respect to the SRF's 402G-H, as well as others.

Continuing the above example, if the authority engine 114 determines that NFL players may be authoritative on the subject of a query, a list of NFL players may be created and/or accessed to identify sources 110 who may be considered authoritative on the subject of the superbowl, and the authority of the sources 110 and/or a confidence level associated with an authority determination may be increased, decreased, verified, or determined. The lists or categories can include subsets or subcategories that may be used to further increase the confidence in using the association approach to determine authority. In the above example, a first subset may include a list of NFL players who have played in the superbowl. A second subset may include a subset of the first subset, and may include a list of NFL players who played in and won the superbowl. A third subset may include a subset of the second subset, and may include NFL players who played in and won the superbowl multiple times. Additional lists, categories, and subsets are contemplated, but are not presented herein for the sake of brevity. Additionally, all of the above examples are illustrative, and should not be construed as being limiting in any way.

In some contemplated embodiments, one, some, or all of the SRF's 402 are used to calculate the authority value 200. In certain circumstances, for example when weighting authority of search results relating to gossip, fashion, or the like, the SRF 402A alone may be used to calculate the authority value 200. Furthermore, each of the SRF's 402 may vary based upon time. As such, each of the SRF's 402 may include a corresponding time function that indicates how time affects the value of the SRF 402. Additionally, or alternatively, the authority value 200 is determined and associated with a time value. Each time the authority value 200 is updated, a new record 314 is generated and stored. Such authority values 200 may be analyzed over time to discover trends affecting authority or for other purposes.

As mentioned above, the inputs 404 corresponding to the SRF's 402 may be entered into a one or more formulae, and an authority value 200 for the source 110 may be calculated. Calculation of an authority value 200 for the source 110 may be completed and repeated on demand, when a search result associated with the source 110 is obtained in a search, periodically, or at another time. As mentioned above, the authority of a source 110 may change quickly based upon various considerations. In the case of news, for example, an authoritative source 110 is relatively difficult to find when the news is first uncovered, compared to a later time at which the news has been covered by multiple entities. Thus, the authority of a source 110 may be viewed as an absolute value, e.g., the authority value 200 calculated based upon the SRF's 402 and their respective inputs 404, or the authority of a source 110 may be determined by comparing the authority value 200 corresponding to a source 110 to authority values 200 for other sources.

It should be understood that each of the SRF's 402 can have a corresponding confidence interval or confidence value that may be reflected in the formulae for determining the authority value 200. Thus, in addition to a weight multiplier, the values 404 determined for the SRF's 402 may be statistically altered based upon confidence values and/or intervals, which may be varied based upon time, topic, POV, and/or application, as well as other factors.

Furthermore, while the SRF's 402 have been described as being determined based upon explicit data, it should be understood that the SRF's 402 may be determined using implicit data. For example, when considering the SRF 402D, the authority engine 114 may search any reference to the source 110, parse the reference, and perform natural language parsing or other recognition operations to characterize the reference as positive, negative, or neutral. This example is illustrative of how implicit data may be used to supplement explicit data, and should not be construed as being limiting in any way. Once the data corresponding to the SRF's 402 are obtained, the authority value 200 for the source 110 may be calculated. Methods for calculating the authority of a source 110 are described below with reference to FIG. 5.

Figure 5:
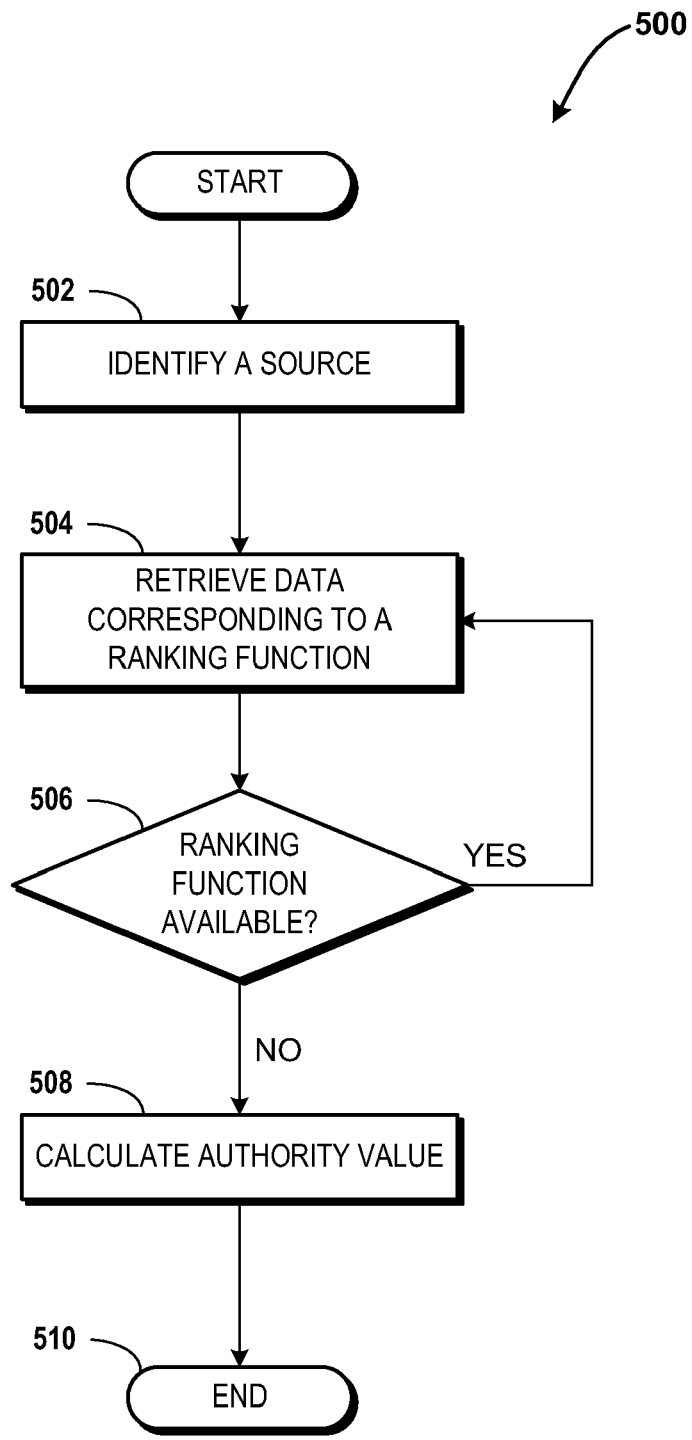
FIG. 5 is a flow diagram showing aspects of a method for calculating an authority value, according to an exemplary embodiment of the present disclosure.

Turning now to FIG. 5, a method 500 for determining an authority value 200 associated with a source 110 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. For purposes of illustrating and describing the concepts of the present disclosure, the methods disclosed herein are described as being performed by the authority engine 114. It should be understood that the described embodiments are merely exemplary and should not be viewed as being limiting in any way.

The method 500 begins at operation 502, wherein the authority engine 114 identifies a source 110 for which an authority value 200 is desired. In some implementations, the authority engine 114 identifies the source 110 in response to a search performed by a search engine. The search engine identifies content 106 associated with the source 110. The identification of the source 110 is passed to the authority engine 114 to determine the authority of the source 110 for purposes of ranking or weighting the search results. In some implementations, an entity accesses the authority engine 114 to determine the authority of a source 110. In a contemplated embodiment, the entity is considering hiring a new employee and receives a resume for the prospective employee and queries the authority engine 114 to determine if the prospective employee is authoritative with respect to the subject matter of the contemplated employment.

From operation 502, the method 500 proceeds to operation 504, wherein the authority engine 114 retrieves data corresponding to an SRF 402. To obtain the data corresponding to the SRF 402, the authority engine 114 may access the network 104, or can query a search engine or other data store that can obtain the data. For example, if data for the SRF 402A is wanted, the authority engine 114 or another device can access one or more data feed services associated with the source 110 to determine how many followers, network connections, or RSS feed subscribers follow, are connected with, or subscribe to content 106 associated with the source 110. Thus, the operation 504 can include accessing various devices to obtain data corresponding to the inputs 404 described above with reference to FIG. 4.

From operation 504, the method 500 proceeds to operation 506, wherein the authority engine 114 determines if data for an additional SRF 402 is needed for completing the determination of the authority value 200. In some embodiments, the authority engine 114 obtains data for some or all of the SRF's 402 to determine the authority value 200 for a source 110. Thus, the operation 506 includes determining if the authority engine 114 has data for each SRF 402 that will be used to determine the authority value 200. If the authority engine 114 determines that additional data is needed to determine the authority value 200, i.e., the authority engine 114 has not yet retrieved data for each of the SRF's 402, the method 500 returns to operation 504, whereat the authority engine 114 retrieves data for another SRF 402. If the authority engine 114 determines that all data for the SRF's 402 has been obtained, the method 500 proceeds to operation 508.

At operation 508, the authority engine 114 determines the authority value of the source 110. As explained above, the authority engine 114 retrieves the data obtained in the operation 504, and any iterations thereof, and inserts the retrieved data into a authority value computation formula or formulae. The formula can be broadly defined as $A(S, T, P, t, L) = w_1 srf_1 + w_2 srf_2 + \ldots + w_n srf_n$, i.e., authority (A) as a function of source (S), topic (T), POV (P), time (t), and location (L) is equal to the sum of each of the SRF's 402 ($srf_1$ through $srf_n$) multiplied by a respective weight ($w_1$ through $w_n$). While the formula set forth above is linear in nature, it should be understood that non-linear formulae are possible.

It should be appreciated that various formulae and/or combinations of the SRF's 402 may be employed by the authority engine 114. The authority engine 114 may use different authority formulae and/or combinations of SRF's 402 depending upon an anticipated use of the authority value 200. For example, for primarily scholarly, research, and/or legal applications, the weights applied to the SRF's 402H, 402I, and 402Q may be greater than the weights applied to the SRF's 402A and 402L, or may be the only SRF's 402 used by the authority engine 114 to calculate the authority value 200.

For primarily gossip, entertainment, or similar applications, the weights applied to the SRF's 402A and 402B may be greater than the weight applied to the SRF 402Q, or may be the only SRF's 402 used by the authority engine 114 to calculate the authority value 200. Some of the SRF's 402, for example the SRF's 402A and 402B, may reflect popularity more than authority on a given topic. Depending upon the anticipated use of the authority value 200, some formulae are designed to exclude and/or assign a lower weight to some of the SRF's 402, compared to other formulae. Similarly, some formulae include and/or assign a lower weight to some of the SRF's 402 than other formulae. These examples are illustrative, and should not be construed as being limiting in any way.

The determined authority may be stored in the authority index 116, if desired, for example as the authority value 200 illustrated in FIG. 3. While not illustrated in FIG. 5, the authority engine can display the authority value 200 and/or the SRF's 402 and the data determined for each of the SRF's 402 for review by users, if desired. The users may review the displayed SRF's 402 to understand why sources 110 are ranked the way they are in terms of authority, may be given the ability to select, deselect, apply, or remove filters based upon the SRF's 402, may be given the ability to provide feedback to an entity or system providing the authority value 200, and/or may be given the ability to adjust the weight of one or more SRF's 402. The method 500 ends at operation 510.

FIG. 6 illustrates an exemplary computer architecture 600 for an authority server 116 capable of executing the software components described herein for providing authority ranking for real time and social search as described above. The computer architecture 600 illustrated in FIG. 6 illustrates a conventional server, desktop, and/or laptop computer, and may be utilized to execute any aspects of the software components presented herein, e.g., the authority engine 114.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, application programs, e.g., a search engine and/or an ranking engine (not illustrated), and the authority engine 114.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media that can be accessed by the computer architecture 600.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600.

According to various embodiments, the computer architecture 600 may operate in a networked environment using logical connections to remote computers through a network such as the network 110. The computer architecture 600 may connect to the network 110 through a network interface unit 614 connected to the bus 610. It should be appreciated that the network interface unit 614 also may be utilized to connect to other types of networks and remote computer systems, for example, the authority index 116. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

As mentioned briefly above, a number of program modules and data files may be stored in the mass storage device 612 and RAM 606 of the computer architecture 600, including an operating system suitable for controlling the operation of the server, desktop, and/or laptop computer. The mass storage device 612 and RAM 606 also may store other types of program modules and data, including the authority index 116 described above.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that technologies for providing authority ranking for real time and social search have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for determining an authority value for a source, the computer-implemented method comprising performing computer-implemented operations for:
    identifying, at a computer, the source, wherein the source comprises an author of content;
    obtaining authority data associated with the source, the authority data comprising values for a plurality of subordinate ranking functions;
    multiplying the values by weights associated with the subordinate ranking functions to generated weighted values;
    calculating the authority value by applying a function to calculate a sum of the weighted values; and
    associating the authority value with the source.

2. The method of claim 1, wherein the authority data comprises data relating to a social networking service.

3. The method of claim 2, wherein the authority data comprises a number of subscribers to a data feed associated with the source.

4. The method of claim 2, wherein the authority data comprises a computation based upon a social network associated with the source.

5. The method of claim 4, wherein the computation based upon the social network associated with the source comprises:
    analyzing the social network associated with the source;
    assigning a first authority score to the source, if an entity comprises a member of a social network associated with the source; and
    assigning a second authority score to the source, if the source comprises a member of a social network associated with the entity.

6. The method of claim 4, wherein the computation based upon the social network associated with the source comprises:
    analyzing the social network associated with the source;
    assigning an authority score to the source;
    determining a number of social network connections between an entity and the source; and
    adjusting the authority score depending on the number of social network connections between the entity and the source.

7. The method of claim 2, wherein the authority data is obtained using a collaborative filtering computation.

8. The method of claim 7, wherein obtaining the collaborative filtering computation comprises:
    receiving a request for an authority value relating to the source and a first topic;
    determining that the authority value for the source and a second topic is available; and
    assigning the authority value for the source and the first topic as being equal to the authority value for the source and the second topic upon determining that the first topic and the second topic are substantially similar.

9. The method of claim 8, wherein determining that the first topic and the second topic are substantially similar comprises:
    accessing an authority index storing authority values, source data, and topic data;
    analyzing the authority index to determine how the topic data affects the authority value relating to the source; and
    determining that the authority values for the first topic and the second topic are substantially similar if the topic data for the source does not substantially affect the authority values relating to the source.

10. The method of claim 1, wherein the authority data comprises a number of reviews relating to the source.

11. The method of claim 1, wherein the authority data comprises a numerical value corresponding to an explicit authority rating for the source.

12. The method of claim 1, further comprising:
associating the authority value with the source and a topic; and
storing the authority value at an authority index, the authority index being configured to store the authority value, topic data indicating the topic, and source data indicating the source.

13. The method of claim 12, further comprising:
receiving a request to determine if the source is authoritative with respect to the topic;
retrieving the authority value corresponding to the source and the topic; and
determining if the source is authoritative based upon the authority value.

14. The method of claim 2, further comprising:
associating the authority value with the source, a topic, and a point of view;
storing the authority value at an authority index, the authority index being configured to store the authority value, topic data indicating the topic, point of view data indicating a point of view, and source data indicating the source;
receiving a request to determine if the source is authoritative with respect to the topic from the point of view;
retrieving the authority value corresponding to the source, the topic, and the point of view; and
determining how authoritative the source is based upon the authority value.

15. The method of claim 1, wherein the authority data comprises a value representing a rating of an institution with which the source is affiliated.

16. The method of claim 2, further comprising:
determining location data indicating a location associated with the source, and time data indicating a time at which the authority value was calculated;
associating the authority value with the source, a topic, a point of view, the location data, and the time data;
storing the authority value at an authority index, the authority index being configured to store the authority value, topic data indicating the topic, point of view data indicating a point of view, source data indicating the source, the location data, and the time data;
receiving a request to determine if the source is authoritative with respect to the topic, the point of view, the location, and the time;
retrieving the authority value corresponding to the source, the topic, the point of view, the location, and the time; and
determining if the source is authoritative based upon the authority value.

17. The method of claim 16, further comprising:
obtaining source data for a plurality of sources associated with the topic;
retrieving an authority value and location data for each of the plurality of sources; and
generating a map of authority comprising a visual representation of a map, locations of the plurality of sources, and authority values of each of the plurality of sources.

18. The method of claim 1, wherein the authority data comprises an indication of an amount of education the source has and a value indicating a rating of an institution from which the source graduated.

19. A system for determining an authority value for a source, the system comprising:
an authority index storing
an authority value,
source data indicating a source associated with the authority value,
topic data indicating a topic associated with the authority value,
point of view data indicating a point of view associated with the authority value,
time data indicating a time at which the authority value was calculated, and
location data indicating a geographic location associated with the authority value; and
a computer in communication with the authority index, the computer executing an authority engine configured to generate the authority value by
obtaining authority data corresponding to subordinate ranking functions and relating to the source,
multiplying the authority data by respective weights to obtain weighted authority data,
calculating the authority value by summing the weighted authority data, and
storing the authority value at the authority index with data identifying the authority value as associated with the source.

20. A computer-readable storage medium having computer-readable instructions stored thereupon that, when executed by a computer, cause the computer to:
identify a source associated with content identified in search results generated by a search engine, the search results relating to a topic and a point of view;
obtain authority data corresponding to subordinate ranking functions, the authority data relating to the source;
multiply the authority data by respective weights to obtain weighted authority data;
calculate an authority value comprising a calculation based upon the weighted authority data, and time data indicating a time at which the authority value was calculated;
associate the authority value with the source, the topic, the point of view, and the time data;
store the authority value and the time data at an authority index, the authority index being configured to store the authority value, topic data indicating the topic, point of view data indicating a point of view, source data indicating the source, and time data;
receive a request to determine if the source is authoritative with respect to the topic, the point of view, and the time;
retrieve the authority value corresponding to the source, the topic, the time, and the point of view;
determine how authoritative the source is based upon the authority value;
display the authority value, the subordinate ranking functions, and the authority data to indicate how the authority value was computed; and
receive feedback relating to how the authority value was computed.

* * * * *